INVENTORS
MICHEL LEBRUN
MARCEL GESTER
BY Bacon & Thomas
ATTORNEYS

INVENTORS
MICHEL LE BRUN
MARCEL GESTER
BY Bacon & Thomas
ATTORNEYS

United States Patent Office 3,444,524
Patented May 13, 1969

3,444,524

METHOD AND SYSTEM FOR COORDINATING BINARY INFORMATION WHEREBY TO TRANSMIT CONTROL COMMANDS

Michel Lebrun and Marcel Gester, Paris, France, assignors to Societe Anonyme dite: Compagnie des Freins et Signaux Westinghouse, Paris, France Filed Apr. 13, 1966, Ser. No. 542,331
Claims priority, application France, Apr. 14, 1965, 13,270
Int. Cl. G06f *7/00*
U.S. Cl. 340—172.5 2 Claims

ABSTRACT OF THE DISCLOSURE

A method of coordinating binary information in order to transmit control commands, including the steps of reading the information in the form of binary instructions into a register, of selecting several of the instructions, of selectively combining the instructions in each selection in accordance with one among several programs, of storing the result of each such combination and of converting each result into a control command. The invention also includes a system for coordinating binary information for transmitting control commands.

The present invention relates to automatic programmed-logic systems for solving equations in which the variables are in the form of binary information.

Known systems for handling such variables can currently be classed under two broad categories, as hereunder:

(a) Computers, which are organized around a central large-capacity storage device and the principal function of which is to solve digital computing problems at very high speed. Though not systematically adapted to the solving of logic equations, they can manifestly be adapted without difficulty to enable them to solve such equations.

(b) Logic and sequential systems used in industrial automation. Such systems are wired for a specific function and are consequently devised in terms of a given problem. In other words, the problem is solved by juxtaposing rigidly wired circuitries, so that solving a subsequent problem implies a different circuitry; further, any subsequent alteration of the problem implies possible modification of the system with all its attendant drawbacks.

The present invention relates to a method of coordinating binary information for the purpose of transmitting control commands characterized by the steps of reading the instructions into a register, of selecting several of these instructions, of selectively combining these selected instructions in accordance with a programme selected among a plurality thereof, of storing the result of each combination.

The invention further relates to a system for performing the method herein disclosed, basically including an instruction register followed by an allocator connected to a switching unit the terminals of which are connected to one input of a logic operator having its other input connected to a programmer for selectively activating circuits in said operator, which operator ultimately feeds a storage register. A cyclic distributor controls the programmer and the switching unit simultaneously.

The coordination system which utilizes the subject method of this invention obviates the disadvantages referred to precedingly. Furthermore, the apparatus devised for performing said method offers the advantages of being very simple in design, of being easy to associate to identical units and of avoiding the use of complex storage devices or counting units, all of which are costly items.

In keeping with one feature of this invention, a number of combinations possibly equal to the number of available choices are carried out, these cycles of combinations being repeated.

In accordance with another feature of the invention, the result of each combination is compared with that obtained for the same combination in the previous cycle. Correct operation of the system, and the condition of the storage devices in particular, can thus be checked at preferably regular time intervals.

Figure 1:
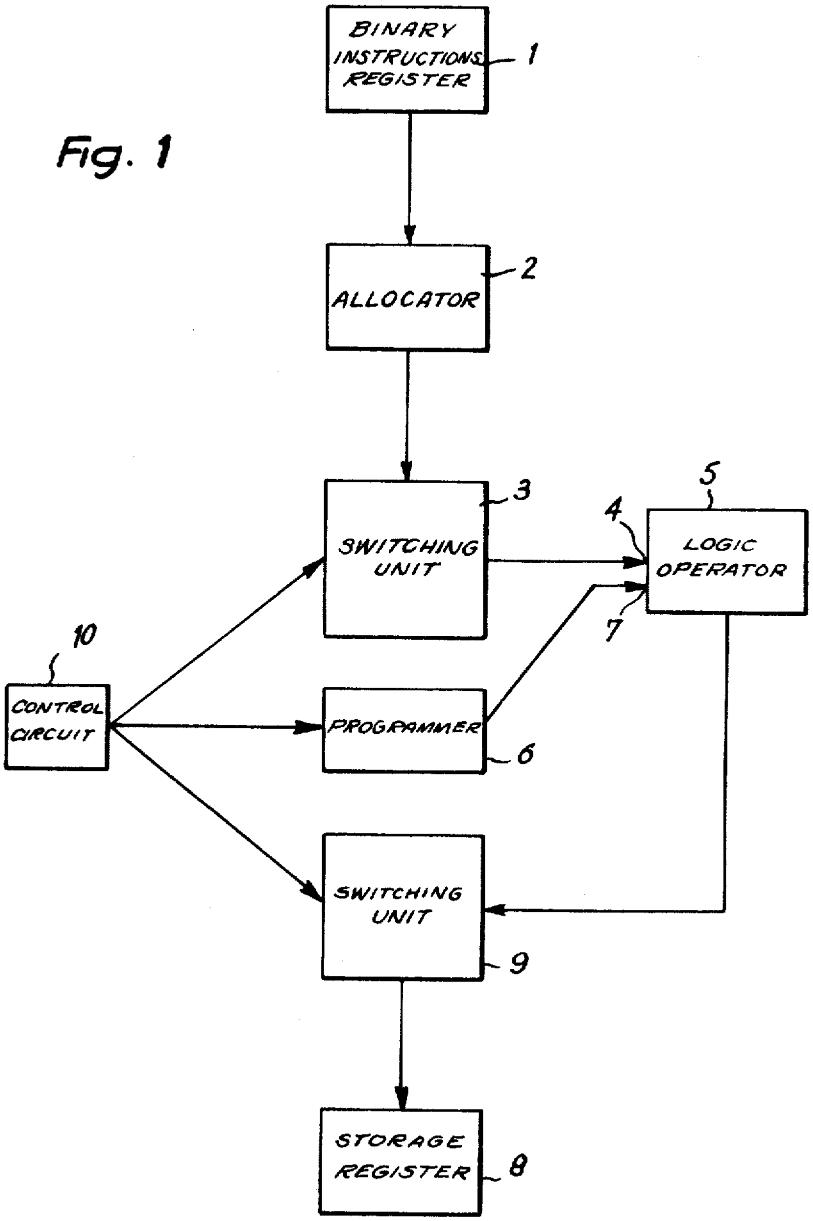
Figure 2:
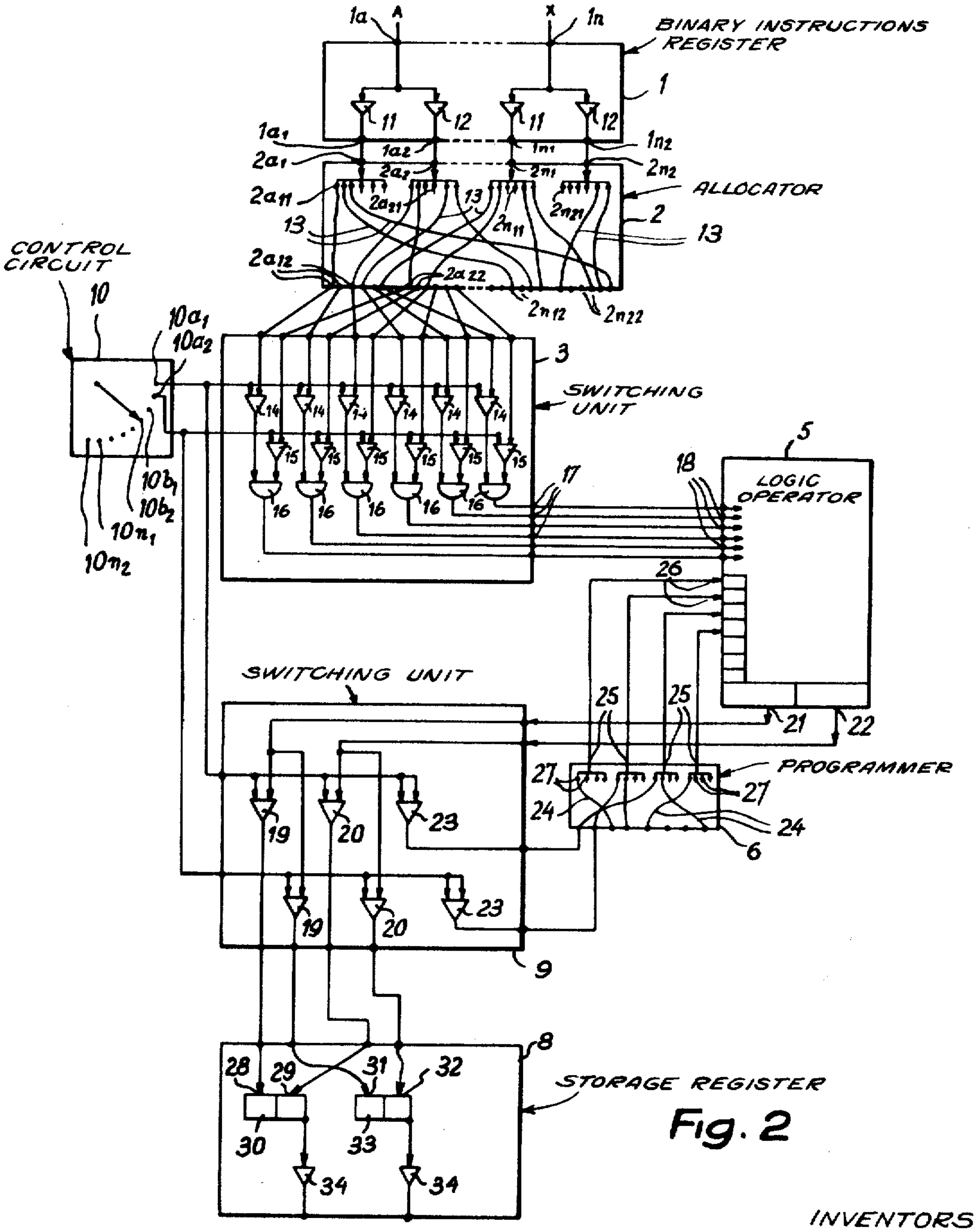

Other advantages of the invention will be made apparent from the description which follows with reference to the accompanying non-limitative exemplary drawing, in which:

FIGURE 1 is a block diagram of a coordinating system according to the invention, and FIGURE 2 is a logic diagram for one possible form of embodiment of a system according to this invention.

Referring to FIGURE 1, the system shown thereon includes a binary instructions register 1 connected to an allocator 2 which feeds a switching unit 3 connected to the input 4 of a logic operator 5. A programmer 6 is connected to the second input 7 of operator 5, which operator feeds into a storage register 8 though a switching unit 9. Input 4 is associated to the operator logic circuits and input 7 to the control means for rendering said circuits selectively effective.

Programmer 6 and switching units 3 and 9 are controlled simultaneously by a circuit 10 which includes, basically, a stepwise operating counting device associated to a generator delivering a binary signal of given value.

The instructions selected from register 1 are sorted in allocator 2 and transmitted to operator 5 according to the binary nature of the signal delivered by circuit 10. Responsively to circuit 10, programmer 6 simultaneously renders a logic circuit of operator 5 effective. The signal delivered by operator 5 is then transmitted to output register 8 on the basis of the value of the signal delivered by circuit 10.

Reference is now had to FIGURE 2 for an example of possible forms of embodiment of the component parts of the system shown in FIGURE 1. Register 1 has as many inputs 1*a*, 1*b* . . . 1*n* as there are binary instructions for possible coordinations. To each input correspond two outputs, to which it is connected respectively through a changeover device 11 and an amplifier 12. Thus, input 1*a* is associated to outputs 1*a*1 and 1*a*2 and input 1*n* to outputs 1*n*1 and 1*n*2. Outputs bearing the subscript 1 deliver the binary instruction in reverse form, while outputs bearing the subscript 2 deliver binary instructions in a straightforward order.

Each register 1 output is connected to an allocator 2 input. Thus register outputs 1*a*1, 1*a*2 . . . 1*n*1, 1*n*2 are connected respectively to allocator input 2*a*1, 2*a*2 . . . 2*n*1, 2*n*2. Each allocator input is connected to a set of terminals, the number of such sets being preferably equal to the number of logic operator 5 circuit inputs, whereby inputs 2*a*1, 2*a*2 . . . 2*n*1, 2*n*2 are connected respectively to terminal sets 2*a*11, 2*a*21 . . . 2*n*11, 2*n*21. To each set of input terminals corresponds an identical set of output terminals designated in like manner to the companion input terminals except that the subscript 1 is replaced by the subscript 2. The input terminals and output terminals of the allocator can be interconnected through electrical conductors 13 having plugs fitted to their ends. Such interconnections can be made in all possible combinations, using any number of variables, and can be modified at any time by merely shifting the plugs.

Switching unit 3 includes a plurality of logic AND-circuit stages 14 and 15, the number of which is equal to the number of sets of allocator 2 output terminals, and the number of AND-circuits in each stage is equal to the number of terminals in each such set. As shown in FIGURE 2, the output terminals **2*a*12 of the first set are connected respectively to one of the two inputs of the first-stage AND-circuits 14, the second inputs of which are connected to the first output 10*a*1 of circuit 10. Similarly, the output terminals 2*a*22 of the second set are connected respectively to one of the two inputs of the second-stage AND-circuits 15, the second inputs of which are connected to the second output 10*a*2 of circuit 10**. This applies to all the logic AND-circuit stages.

System 3 can thus be likened to a board whereon the AND-circuits are classed in rows and columns, with the rows being the stages referred to precedingly. To each column corresponds a logic OR-circuit 16 the inputs to which are respectively connected to the outputs from the AND-circuits of the column involved. The outputs 17 from circuits 16 form the outputs of switching unit 3 and are respectively connected to the logic operator 5 circuit inputs 18, which inputs jointly form the input 4 referred to precedingly. The number of operator 5 circuits is set by the number of combinations differing in form. This number, which is fixed once and for all, can be made relatively small by judiciously applying Morgan's theorems, a possible example being ten.

In point of fact, the system referred to heretofore as the circuit 10 is a distributor which cyclically interconnects the source of a signal-producing voltage of given level with each of the terminals **10*a*1 . . . through 10*n*2 in succession. By way of example, circuit 10** may be a binary counter or a decimal ring counter operated by a fixed or variable frequency signal generator which may be placed in synchronism with any external cyclic phenomenon, or be triggered by external signals delivered by external means monitored or controlled by the output storage devices of the system, whereby the subject coordinating system of the invention can be adopted for solving real-time combinative or sequential logic problems.

Switching units 9 and 3 both include logic AND-circuit stages, the same number of such stages being in switching unit 9 and switching unit 3. Each stage includes two AND-circuits 19 and 20. One of the inputs to circuit 19 and one of the inputs to circuit 20 are respectively connected to two outputs 21 and 22 from operator 5, the signals furnished by outputs 21 and 22 being the opposite of each other. Each stage also includes a third AND-circuit 23 the two inputs to which, together with the second inputs to circuits 19 and 20, are connected to the same output from distributor 10. Thus the inputs into the first-stage AND-circuits are connected to output **10*a*1, those into the second-stage AND-circuits are connected to output 10*a*2**, and so on.

The outputs from circuits 23 are respectively connected to the inputs to programmer 6. Like allocator 2, programmer 6 is devised with terminals and conductors 24 having their ends fitted with plug-in connectors. Programmer 6 includes as many outputs 25 as there are operator 5 logic circuits. Outputs 25 are respectively connected to operator inputs 26, each of which is associated to means for rendering a specific logic circuit effective. These control means are shown in highly diagrammatic fashion in the form of small rectangles in order to distinguish them from the other operator inputs. Each output 25 is associated to a set of terminals 27, the number of which can in no case exceed the number of programmer inputs. Interconnections between the input terminals and the output terminals can be provided in all possible combinations and can be modified at any time by merely moving the plug-in connectors.

The outputs from first-stage circuits 19 and 20 of switching unit 9 are connected respectively to inputs 28 and 29 of a bi-stable storage device 30 of register 8. Similarly, the outputs from the second-stage circuits 19 and 20 of switching unit 9 are connected respectively to inputs 31 and 32 of a further bi-stable storage device 33, and this likewise applies to the outputs from the circuits 19 and 20 of all the other stages. Preferably, register 8 has as many storage devices as there are stages in switching unit 9, and the inputs into any given store can be connected to the circuits of two different stages. The outputs from each store are connected to the outputs from register 8 through amplifiers 34.

The principle of operation of the system is similar to that hereinbefore described. When distributor 10 is set to position **10*a*1, the corresponding inputs of the first-stage circuits 14 switch from the binary state 0 to the binary state 1. Depending on the binary nature of the data inputs into register 1 and the choice made by allocator 2, the signals delivered by circuits 14 will be a binary 1 or a binary 0. These signals are transmitted through OR-circuits 16 to the inputs 18 of operator 5**.

Simultaneously, the circuit 23 inputs, associated to output **10*a*1 switch from binary 0 to binary state 1. The signal delivered by circuit 23 is transmitted by programmer 6** to the control means for rendering effective the particular one of the operator circuits selected by the programmer.

The signals delivered by the operator are then transferred to circuits 19 and 20 and cause one input of first-stage circuit 19 or 20 of switching unit 9 to be set to binary level 1 and the other to be reset to binary level 0. The other inputs of these circuits will all be at binary level 1 since distributor 10 is still set in position **10*a*1. In other words, inverse control signals are applied to storage device 30 to render it effective or ineffective according to signal levels. The signal issuing from storage device 30** is of the binary kind, and the states thereof can be used to control dynamic elements such as relays, contact switches, electrically operated valves and the like, or to control logic units of all kinds; alternatively, the binary level of this signal can be fed back to an input of the same or a different coordinating system.

When distributor 10 moves from position **10*a*1 to position 10*a*2, the inputs of the AND-circuits associated to 10*a*1 change from binary state 1 to binary state 0, but the state of storage device 30 remains unchanged. The inputs to the AND-circuits associated to 10*a*2 change from binary level 0 to binary level 1, and the functional process hereinbefore described recommences with the rendering effective by programmer 6 of another operator 5 circuit for combining the instructions selected by allocator 2 and transferred to the second stage of switching unit 3. The output signal from store 33** can then be used as previously indicated.

When, upon successively transiting through all the various positions, circuit 10 reverts to position **10*a*1, the signals applied to storage device 30 will either consolidate the same in its previously existing binary state or cause it to revert thereto should a spurious signal meanwhile disrupt operation of the system; alternatively, they will reset the storage device should the combination made by the operator not be checked out. The operating cycle of circuit 10** is normally of short duration, thus enabling the stores to be updated periodically.

To modify the choice of instructions to be combined by the operator, all that is necessary is to alter the positions of the plug-in connectors fitted to conductors 13, on the terminals of allocator 2. Similarly, in order to modify the order of execution of the various combinations, it will suffice to alter the positions of the plug-in connectors of conductors 24 in the terminal sockets of programmer 6. Such modifications are extremely easy to make and represent an outstanding advantage of the system of the present invention. Further, the operator logic circuits can be designed with sufficient flexibility to accommodate a large number of different combinations.

It goes without saying that many changes and substitutions may be made to the specific form of embodiment hereinbefore described without departing from the spirit and scope of the invention.

By way of example, the AND and OR logic circuits, the amplifiers, the changeover units and the storage devices could be designed to incorporate the safety circuits stipulated in railroad safety specifications.

What I claim is:

1. A system for coordinating binary information in order to transmit control commands comprising:

a binary information register adapted to receive said information, an allocator having input terminals connected to said binary register and output terminals connected to a first logic switching unit, said allocator input terminals being internally connected to said allocator output terminals by removable plug-in connectors, a logic operator having input terminals connected to an output of said first switching unit and to the output of a programmer, said logic operator also having output terminals connected to a second switching unit, a storage register connected to receive the output of said second switching unit, a cycling control unit providing input signals to said first switching unit, said programmer and said second siwtching unit, said first switching unit comprising a plurality of AND gates arranged in rows and columns, a separate OR gate corresponding to each column of AND gates, circuit means connecting the outputs of all the AND gates in any given column as inputs to said corresponding OR gate, circuit means commonly connecting a first input of all AND gates in any given row to receive an input signal from said control unit, and circuit means connecting a second input of each AND gate to a separate output terminal of said allocator, whereby each of said rows of AND gates corresponds to an AND gate stage.

2. A system as described in claim 1 wherein said logic operator has two output terminals to accommodate output signals of opposite polarity.

References Cited

UNITED STATES PATENTS

| | | | |
|---|---|---|---|
| 2,978,175 | 2/1954 | Newman | 235—157 |
| 3,061,192 | 10/1962 | Terzian | 235—157 |

ROBERT C. BAILEY, *Primary Examiner.*

JOHN P. VANDENBURG, *Assistant Examiner.*